(12) United States Patent
White et al.

(10) Patent No.: US 7,058,809 B2
(45) Date of Patent: Jun. 6, 2006

(54) METHOD AND SYSTEM TO UNIQUELY ASSOCIATE MULTICAST CONTENT WITH EACH OF MULTIPLE RECIPIENTS

(75) Inventors: Mark Andrew George White, Carlsbad, CA (US); Andrew Augustine Wajs, Haarlem (NL)

(73) Assignees: Entriq, Inc., Carlsbad, CA (US); Irdeto Acess B.V., Hoofddorp (NL)

( * ) Notice: Subject to any disclaimer, the term of this patent is extended or adjusted under 35 U.S.C. 154(b) by 791 days.

(21) Appl. No.: 09/800,842

(22) Filed: Mar. 6, 2001

(65) Prior Publication Data

US 2003/0009669 A1 Jan. 9, 2003

Related U.S. Application Data

(60) Provisional application No. 60/218,031, filed on Jul. 12, 2000.

(30) Foreign Application Priority Data

Mar. 6, 2000 (EP) ................................. 00200793

(51) Int. Cl.
*H04L 9/00* (2006.01)
*H04N 7/167* (2006.01)

(52) U.S. Cl. .................. 713/176; 380/54; 380/200; 380/201; 380/203

(58) Field of Classification Search ........ 380/277–278, 380/54, 200–203; 713/168, 176; 382/100, 382/115–118, 124; 705/57–59, 62
See application file for complete search history.

(56) References Cited

U.S. PATENT DOCUMENTS

| 5,111,504 A | 5/1992 | Esserman et al. ............. 380/21 |
| 5,613,004 A | 3/1997 | Cooperman et al. .......... 380/28 |

(Continued)

FOREIGN PATENT DOCUMENTS

WO WO-0004713 A1 1/2000

(Continued)

OTHER PUBLICATIONS

"Functional model of a conditional access system", EBU Review Technical (1995) Winter, No. 266, Grand-Saconnex, CH, pp. 64-77.

(Continued)

*Primary Examiner*—Hosuk Song
(74) *Attorney, Agent, or Firm*—Schwegman, Lundberg, Woessner & Kluth, P.A.

(57) ABSTRACT

Methods and systems are disclosed in which contact can be safely distributed and protected in a manner that is viable in terms of bandwidth economy and ensures that clients can be identified by the content received. Copies of encrypted content can be provided such that unique watermarks can be added to the copies. Content can also be both watermarked uniquely for multiple clients and multicasted to the clients. As such, content can be distributed using the bandwidth efficiency of multicasting while providing reliable content protection and watermarking.

60 Claims, 10 Drawing Sheets

U.S. PATENT DOCUMENTS

| | | | |
|---|---|---|---|
| 5,636,292 A | 6/1997 | Rhoads | 382/232 |
| 5,659,726 A | 8/1997 | Sandford, II et al. | 395/612 |
| 5,664,018 A | 9/1997 | Leighton | 380/54 |
| 5,687,191 A | 11/1997 | Lee et al. | 375/216 |
| 5,687,236 A | 11/1997 | Moskowitz et al. | 380/28 |
| 5,710,834 A | 1/1998 | Rhoads | 382/232 |
| 5,734,752 A | 3/1998 | Knox | 382/212 |
| 5,745,569 A | 4/1998 | Moskowitz et al. | 380/4 |
| 5,745,604 A | 4/1998 | Rhoads | 382/232 |
| 5,748,763 A | 5/1998 | Rhoads | 382/115 |
| 5,748,783 A | 5/1998 | Rhoads | 382/232 |
| 5,768,426 A | 6/1998 | Rhoads | 382/232 |
| 5,790,664 A | 8/1998 | Coley et al. | |
| 5,799,086 A | 8/1998 | Sudia | |
| 5,809,139 A | 9/1998 | Girod et al. | 380/5 |
| 5,982,891 A | 11/1999 | Ginter et al. | 380/4 |
| 5,991,426 A * | 11/1999 | Cox et al. | 382/100 |
| 6,002,772 A | 12/1999 | Saito | |
| 6,037,984 A | 3/2000 | Isnardi et al. | 348/403 |
| 6,208,745 B1 | 3/2001 | Florencio et al. | |
| 6,209,094 B1 | 3/2001 | Levine et al. | |
| 6,332,194 B1 * | 12/2001 | Bloom et al. | 713/176 |
| 6,343,280 B1 | 1/2002 | Clark | |
| 6,425,081 B1 * | 7/2002 | Iwamura | 713/176 |
| 2001/0051996 A1 | 12/2001 | Cooper et al. | |
| 2002/0026581 A1 | 2/2002 | Matsuyama et al. | |
| 2002/0087970 A1 | 7/2002 | Dorricott et al. | |
| 2003/0009669 A1 | 1/2003 | White et al. | |

FOREIGN PATENT DOCUMENTS

| | | | |
|---|---|---|---|
| WO | PCT/US01/07206 | 3/2001 | |

OTHER PUBLICATIONS

Ralph C. Merkle, "Protocols for Public Key Cryptosystems", CH1522-2C/80/0000-0122S00.75, 1980 IEEE, p. 122-134.

W. L. Price, D. W. Davies, "Issues in the Design of a Key Distribution Centre", National Physical Laboratory, NPL Report DNACS 43/81, Apr. 1981, ISSN 0143-7348.

R. E. Lennon, S. M. Matyas, C. H. Meyer, "Cryptographic Key Distribution for Terminal to Terminal Communications", IBM Technical Disclosure Bulletin, vol. 22, No. 2, Jul. 1979, p. 636-639.

Schneier, "Protocol Building Blocks", Applied Cryptography, second edition, published by John Wiley and Sons, Inc., Oct. 18, 1995, Chapter 2, p. 21-46.

Schneier, "Basic Protocols", Applied Cryptography, second edition, published by John Wiley and Sons, Inc., Oct. 18, 1995, Chapter 3, p. 47-74.

Van Rijnsoever, B J., et al., "Interoperable Content Protection for Digital TV", *Philips Research, Prof. Holstlaan 4, Eindhoven, The Netherlands*, Copyright 2000 IEEE, 4 pages.

Matthews, James R., "PCT Search Report," (Jul. 10, 2003), 4 pages.

"Watermarking May Hold Key To Sharing Copyrighted Material", Peter Wayner, Interactive Week Special To Interactive Week, Jan. 29, 2001, 5 pages.

* cited by examiner

METHOD AND SYSTEM TO UNIQUELY ASSOCIATE MULTICAST CONTENT WITH EACH OF MULTIPLE RECIPIENTS

RELATED APPLICATIONS

This application is related to and claims priority to European Patent Application No. 00200793.8 entitled, "METHOD AND SYSTEM FOR PROVIDING COPIES OF SCRAMBLED CONTENT WITH UNIQUE WATERMARKS, AND SYSTEM FOR DESCRAMBLING SCRAMBLED CONTENT," filed on Mar. 6, 2000, which is hereby incorporated herein by reference. This application is also related to and claims priority to U.S. Provisional Application No. 60/218,031 entitled, "METHOD AND SYSTEM TO UNIQUELY ASSOCIATE MULTICAST CONTENT WITH EACH OF MULTIPLE RECIPIENTS," filed on Jul. 12, 2000, which is hereby incorporated herein by reference.

FIELD OF THE INVENTION

The present invention relates generally to data processing. More particularly, the present invention relates to "watermarking" or uniquely identifying content. Specifically, the present invention relates to a method and system to associate uniquely content with each of multiple recipients.

BACKGROUND OF THE INVENTION

Today, text, audio, and video content ("content") can be transmitted using a number of technologies. For example, a server on the Internet can transmit a video clip to a plurality of users. Such a process is typically referred to as "streaming." A number of challenges exist, however, for streaming content on the Internet. One challenge is content protection. The challenge of content protection relates to preventing illegal copying and distribution of premium content. Another challenge is bandwidth economics. The challenge of bandwidth economics relates to transmitting content within a limited bandwidth.

One method for content protection is watermarking. Watermarking is a process of inserting unique information ("watermark") into content in a non-removable manner. That is, an attempt to remove the watermark may cause loss of all or part of the original content. A watermark is a form of rubber-stamping, e.g., a frame of a motion picture, with a unique signature. Typically, for a server on the Internet to perform watermarking, the server must send content with a different watermark for each user. Thus, a disadvantage of the watermarking process alone is that each item of content must be uniquely watermarked for each user or entity to whom the content is to be distributed. If the number of users to receive the content is large, watermarking can be bandwidth intensive and very complex for the server.

Another method for content protection is content encryption or scrambling. For example, in order to prevent unauthorized copying of content, the content can be encrypted with one or more keys and decrypted by users with correct keys to access the content. Generally, the content is both compressed and encrypted. A disadvantage of encrypting content alone is that after decrypting and descrambling the content unauthorized copies of the content can still be made. To locate the source of such unauthorized copying, a fingerprint or watermark can be added to content to indicate the content is copyright protected. A problem with adding a watermark to encrypted content is that it must be first decrypted before the watermark can be added. Consequently, if the content is encrypted, access to the content is not available. Moreover, adding watermarks and decrypting content requires extensive processing capacity.

One method to address bandwidth constraints is multicasting. Multicasting is the process of a single server sending content to multiple users at the same time. For example, a server on the Internet can send a video clip once ("multicast") to many users. Thus, a single server can send content to many users without either the server or the network becoming too congested. A disadvantage of multicasting alone is that it is difficult to protect the content being multicasted. For instance, multicasting is incompatible with existing watermarking technology because multicasting relies on all users receiving exactly the same data. Watermarking, however, relies on all users receiving uniquely "stamped" data. As such, a number of problems exist with distributing content such as text, audio, and video data on the Internet that relate to providing content within bandwidth constraints and ensuring content is protected or identified.

SUMMARY OF THE INVENTION

According to one aspect of the present invention, a method is disclosed in which a copy of at least one part of content having a first watermark is encrypted. A copy of at least one part of a content having a second watermark is encrypted. Parts of the encrypted copy with the first watermark and parts of the encrypted copy with the second watermark are combined in a manner unique for an individual client.

According to another aspect of the present invention, a method is disclosed in which first and second copies of content are watermarked with respective first and second watermarks. The first copy of the content is encrypted using a first key and the second copy of the content is encrypted using a second key. The encrypted first copy and second copy are combined into a single stream of data.

Other features and advantages of the present invention will be apparent from the accompanying drawings, and from the detailed description, which follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

Methods and systems are described in which content can be safely distributed and protected in a manner that is viable in terms of bandwidth economy and ensures that clients can be identified by the content received. In one embodiment, copies of encrypted content can be provided such that unique watermarks can be added to the copies. In another embodiment, content can be both watermarked uniquely for multiple clients and multicasted to the clients. As such, content can be distributed using the bandwidth efficiency of multicasting while providing reliable content protection of watermarking.

In the following description, a watermark refers to an identifier or signature. For example, the identifier or signature can be used to indicate copyright protected data. The watermark can also be used to indicate the origin and authenticity of the data or the identity of clients/users/customers of the data. In addition, watermarking refers to a process of encrypting content in such a manner that it can be multicasted and still yield a unique version upon decryption. Furthermore, in the following description, for purposes of explanation, numerous specific details are set forth in order to provide a thorough understanding of the present invention. It will be evident, however, to one skilled in the art that the present invention may be practiced without these specific details.

Exemplary Network Environment

Figure 1:
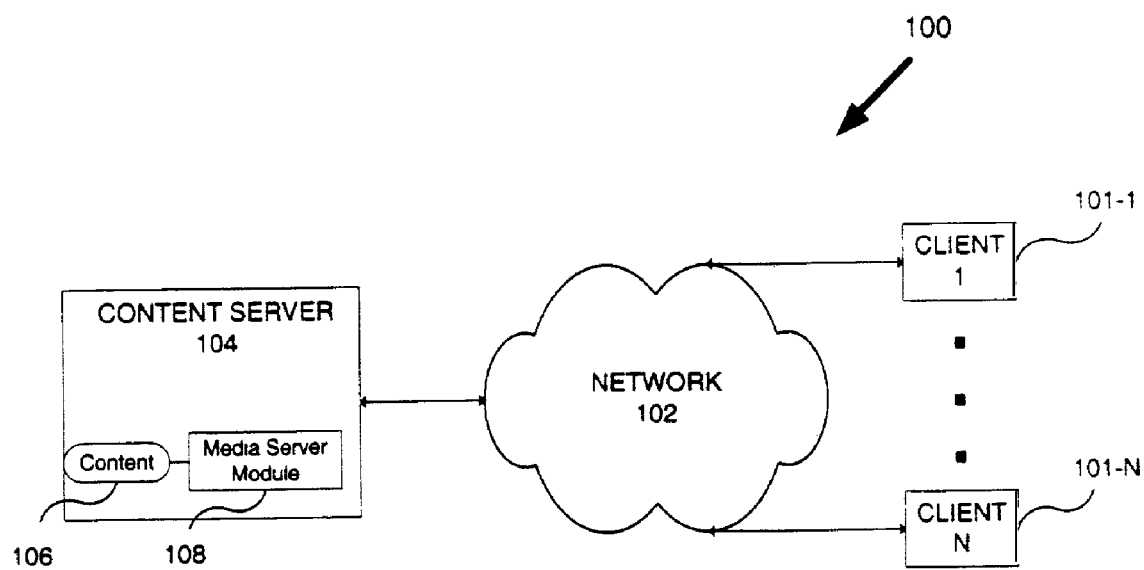
FIG. 1 illustrates an exemplary diagram of a network environment in which the present invention can be implemented.

FIG. 1 illustrates an exemplary diagram of a network environment 100 in which the present invention can be implemented. Referring to FIG. 1, content server 104 can communicate with a plurality of clients 1 (101-1) through N (101-N) via network 102. In one embodiment, network 102 is the Internet. The Internet is a worldwide system of interconnected networks that runs the Internet Protocol (IP) to transfer data (e.g., packets). In other embodiments, network 102 can be other types of networks such as, for example, a token ring network, local area network (LAN), or a wide area network (WAN). Network 102 can also be implemented in a wired or wireless environment.

Content server 104 is a network device for communicating on network 102. In one embodiment, content server 104 is a general purpose computer such as a web server. In other embodiments, content server 104 is a network device including a network router, switch, bridge, gateway, or other like network device, for communicating on network 102. Content server 104 includes a media server module 108 coupled to content storage 106. Content storage 106 is a storage device such as, for example, a hard disk, compact disk (CD), digital video disc (DVD), a random access memory (RAM), a dynamic random access memory (DRAM), or other like memory devices to store content for distribution.

In one embodiment, media server module 108 is a processing device to process instructions or code to perform the operations described herein. In other embodiments, media server module 108 is hardware and/or software modules to perform the same. Media server module 108 retrieves and processes content stored in content storage 106 and distributes the content to clients 1 through N. The content stored in content storage 106 can include video and/or audio data or other like types of data. For example, the content can include Moving Picture Experts Group (MPEG) data. In one embodiment, media server module 108 operates according to the processing techniques as described with respect to FIGS. 2, 3, 4A and 4B. In another embodiment, media server module 108 operates according to the processing techniques as described with respect to FIGS. 5, 6A, 6B, and 7.

Clients 1 through N can be general purpose computers for receiving content from content server 104 via network 102. Alternatively, clients 1 through N can be another content server such as content server 104. For example, clients 1 through N can be personal computers, workstations, laptop computers, or other like computing devices. Clients 1 through N can also be electronic portable devices such as, for example, a personal data assistant (PDA), wireless telephone, or other like devices, which can communicate with content server via network 102 over a wired or wireless medium. Clients 1 through N can include applications to view and display content from content server 104. For example, clients 1 through N can include an application such as, for example, Real Player™ or QuickTime™ to play back video data.

Providing Copies of Encrypted Content with
Unique Watermarks Example

Figure 2:
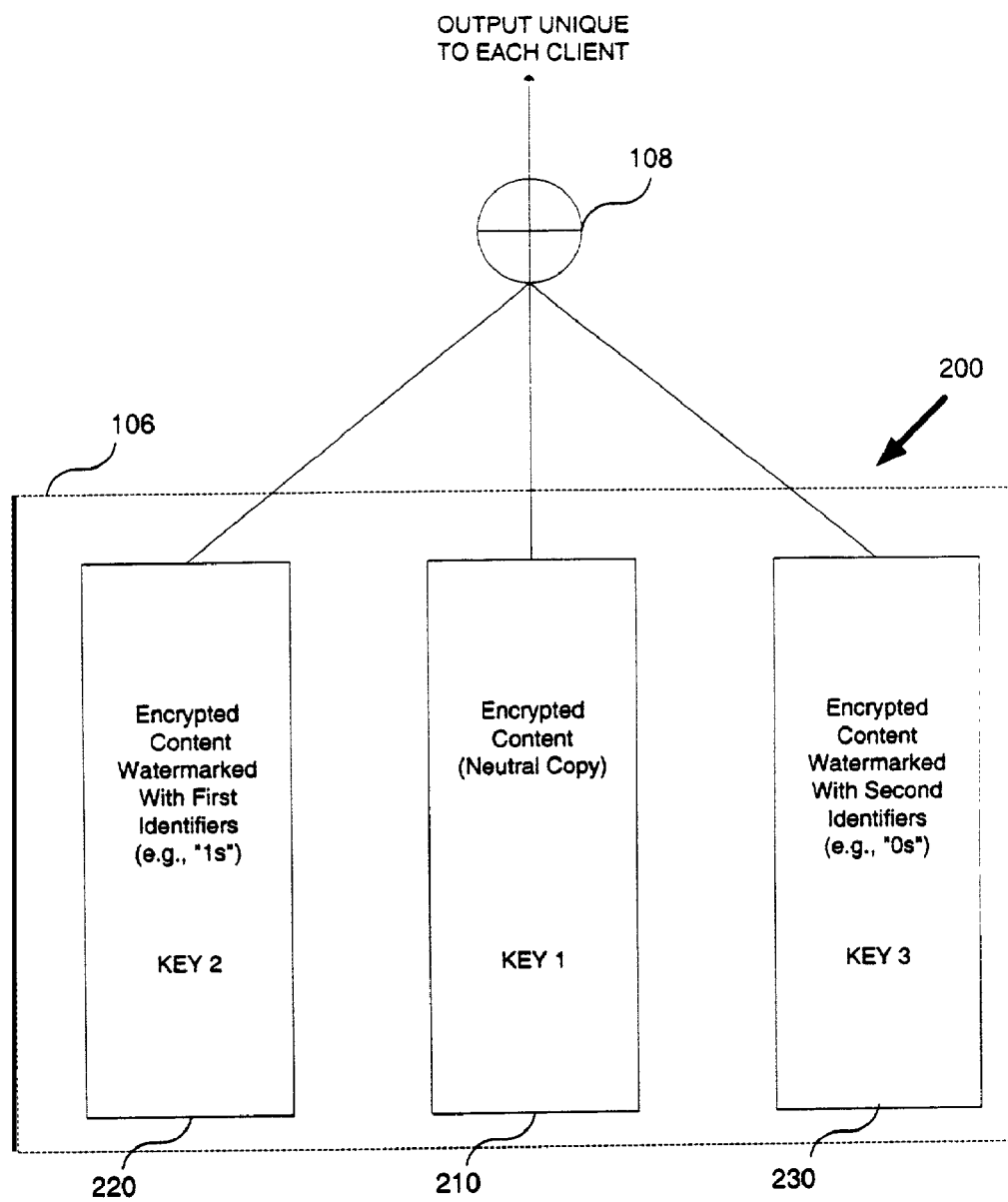
FIG. 2 illustrates a diagram of encrypted content being combined according to one embodiment.

The following embodiments with respect to FIGS. 2, 3, 4A and 4B describe providing copies of encrypted content with unique watermarks for each of a plurality of clients and broadcasting the encrypted content to the clients. FIG. 2 illustrates a diagram 200 of encrypted content being combined according to one embodiment. For purposes of explanation, the content is described as "movie content" but can easily be other types of content, e.g., an audio file of a record.

In one embodiment, content storage 106 includes three copies of movie content. Each copy stored in content storage 106 is encrypted in a suitable manner. A first copy 210 referred to as "neutral copy" is encrypted. A second copy 220 of the content is obtained by adding a watermark a first identifier, e.g., a sequence of "1s" or a more complex binary sequence, to at least one part of the complete content.

Thereafter, second copy 220 is encrypted in a suitable manner so that an encrypted copy watermarked with the first identifier is obtained. A third copy 230 is obtained by adding a watermark with a second identifier, e.g., a sequence of "0s" or a more complex binary sequence, to at least one part of the complete content. Thereafter, third copy 230 is encrypted in a suitable manner so that an encrypted copy watermarked with the second identifier is obtained. Second and third copies 220 and 230 can be watermarked with any unique identifiers.

The watermarked copies 220 and 230 may include a percentage of the original movie content. For example, watermarked copies 220 and 230 may include 1% to 20% of the complete movie content. Nevertheless, the complete movie content can be watermarked with first and second identifiers, respectively. In an alternative embodiment, the neutral copy 210 can be omitted. Furthermore, copies 210, 220, and 230 can be stored on a separate storage device or on a separate server.

In one embodiment, if a client requests the movie content from content server 104, media module server 108 will add a watermark unique to the client. That is, in the example of FIG. 2, the watermark will be a unique identifier having unique sequences of ones ("1s") and zeroes ("0s"). In accordance with this unique sequence of ones and zeros, media module server 108 combines encrypted parts of the neutral copy 210, first copy 220 watermarked with ones, and second copy 230 watermarked with zeroes and forwards the combination to the requesting client. As such, the requesting client receives an encrypted copy with watermarks unique to the client.

The watermarks, however, are not necessary to decrypt and encrypt the content in the relatively insecure environment of content server 104. The unique identification of ones and zeroes and associated client identification information can be stored in content storage 106 or in a separate storage device. Neutral copy 210 of scrambled content is used to reduce the amount of data that needs to be stored in content storage 106. Alternatively, a scrambled copy of content can be provided with a watermark without using neutral copy 210.

Figure 3:
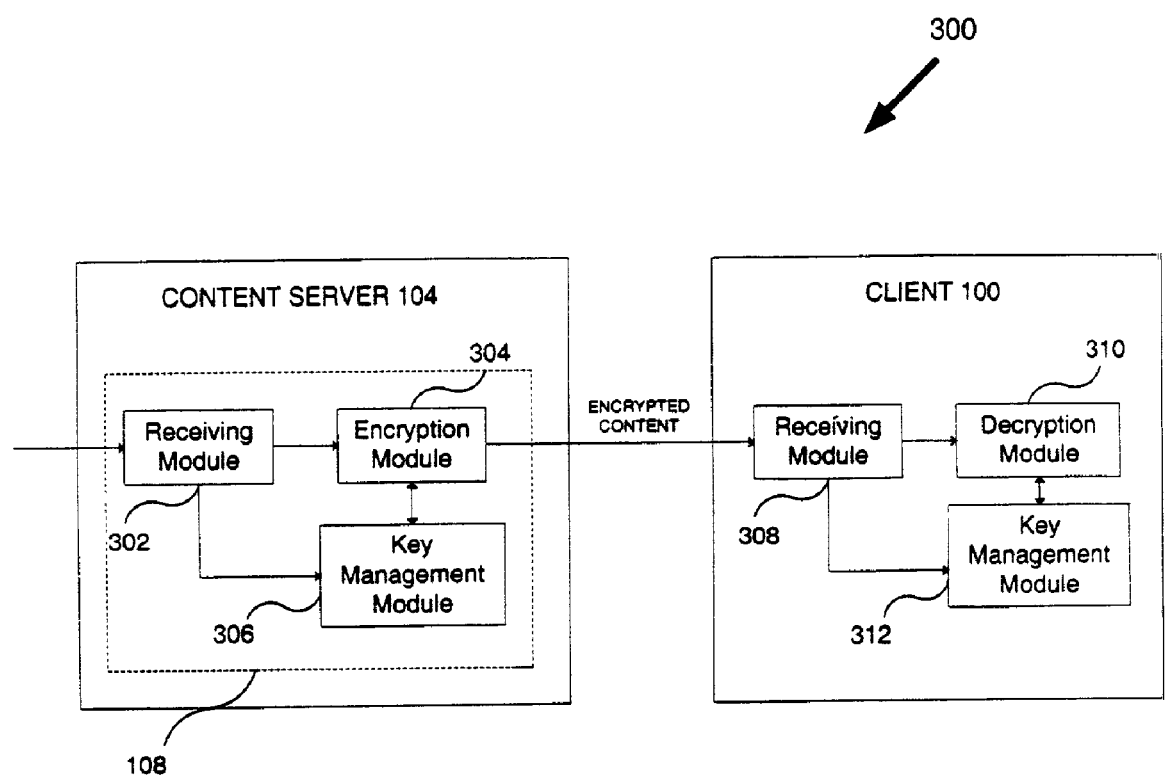
FIG. 3 illustrates a block diagram of a content server communicating encrypted content with a client according to one embodiment.

FIG. 3 illustrates a block diagram 300 of content server 104 communicating scrambled content with a client 100 according to one embodiment. Client 100 can be representative of clients 1 through N in FIG. 1. Referring to FIG. 3, content server 104 includes media server module 108 having a receiving module 302 coupled to encryption module 304, which is coupled to key management module 306. Each of these modules can be a separate processing device or hardware and/or software modules operating within content server 104 to process instructions or code for performing the operations described herein.

Encryption module 304 encrypts content from receiving module 302. In one embodiment, receiving module 302 can receive content from content storage 106. In another embodiment, receiving module 302 receives content from network 102 or an external connection such as a cable or modem line. Encryption module 304 can encrypt content using keys in a standard encrypting process. For example, encryption module 204 can insert keys into a stream of video content as entitlement control messages (ECMs) to encrypt the stream of video content.

In one embodiment, watermarking can be performed on the client side. For example, client 100 can add watermarks during a decryption process for decrypting the encrypted content from content server 104. Client 100 can decrypt the encrypted content from content server 104 in real time or at a later time by storing the encrypted content.

In the following description for purposes of explanation, receiving module 302 in client 100 receives encrypted content that represents a "movie," which is to be broadcasted to client 100. Other types of content can be used such as text or audio content that is commonly broadcasted. Receiving module 302 can be programmed to provide a plurality of double parts or so-called double illuminated parts for the movie. In one embodiment, if the movie is compressed, e.g., under the MPEG standard, I-frames or similar parts are double illuminated to keep bandwidth low. In one embodiment, receiving module 302 provides the double illuminated sections with a watermark. For example, receiving module 302 can add a watermark of zeros (or a first identifier) and a watermark of ones (or a second identifier) to selective sections of each double illuminated part. Receiving module 302 then forwards a neutral section and the double illuminated sections to encryption module 304.

Encryption module 304 uses keys provided by key management module 306. Key management module 306 can include one or more storage devices to store a number of keys to scramble content. In one embodiment, encryption module 304 uses a first key (Key 1) to encrypt the neutral section to provide neutral copy 210, a second key (Key 2) to encrypt watermarked sections with ones to provide second copy 220, and a third key to encrypt watermarked sections with zeros to provide third copy 230.

Key management module 306 in content server 104 includes a key management application to allow client 100 to receive a unique copy of encrypted content by delivering client keys 2 and 3 in a predetermined manner. Key management module 306 also allows client 100 to decrypt the encrypted content from encryption module 304. That is, key management module 100 provides the unique key information to client 100 via encryption module 304 to decrypt the encrypted content having a unique combination of encrypted sections watermarked with zeros (or first identifier) and sections watermarked with ones (or a second identifier). Furthermore, key management module 306 can store information related to which client received which unique combination. In this manner, client 100 can provide a clear content stream of the movie with a unique watermark or identification. Thus, the content stream can easily be identified to determine if the appropriate client is receiving and viewing the movie.

Key management module 306 can, for example, provide entitlement control messages ECMs with Key 1, Key 2, or Key 3. During broadcasting of the encrypted content, key management module 306 provides ECMs to respective clients containing the keys to obtain the unique combinations of ones and zeros at the respective clients. In the example of FIG. 3, key management module 306 can provide the ECMs to client 100 via encryption module 304 or directly using an external connection to network 102.

Client 100 includes a receiving module 308 to receive encrypted content from content server 104. Receiving module 308 can also receive keys from key management module 306 within content server 104. Receiving module 308 is coupled to decrypting module 310, which is coupled to key management module 312. Each of these modules can be a separate processing device or hardware and/or software modules to process instructions or code for performing the operations described herein.

Client 100 uses decryption module 310 to decrypt the encrypted content from content server 104. Receiving module 308 receives encrypted content from encryption module 304 and extracts ECMs from the encrypted content and forwards the ECMs to key management module 312. Key management module 312 provides keys from the extracted ECMs to decryption module 310. Receiving module 308 also provides the encrypted content from content server 104 to decryption module 310.

In one embodiment, content server 104 provides ECMs with Key 1 and Key 2 or Key 3 unique to client 100. In particular, key management module 312 of client 100 delivers the keys to decryption module 310. Decryption module 310 uses the keys to obtain clear content with a unique combination of zeros and ones. In one embodiment, if only Key 2 is available, only the second watermark with ones can be decrypted whereas if only the third key is available only the section watermarked with ones can be decrypted. In this example, watermarking the neutral copy 210 is controlled directly by content server 104.

In an alternative embodiment, key management programs or instructions can be downloaded or permanently stored in key management module 312 within client 100. For example, key management module 312 can include a smart card to provide security to downloaded programs or instructions. In particular, the smart card could receive an ECM including all three keys (Key 1 through Key 3) in which the keys are provided to decryption module 310 in a manner unique to the smart card.

Figure 4A:
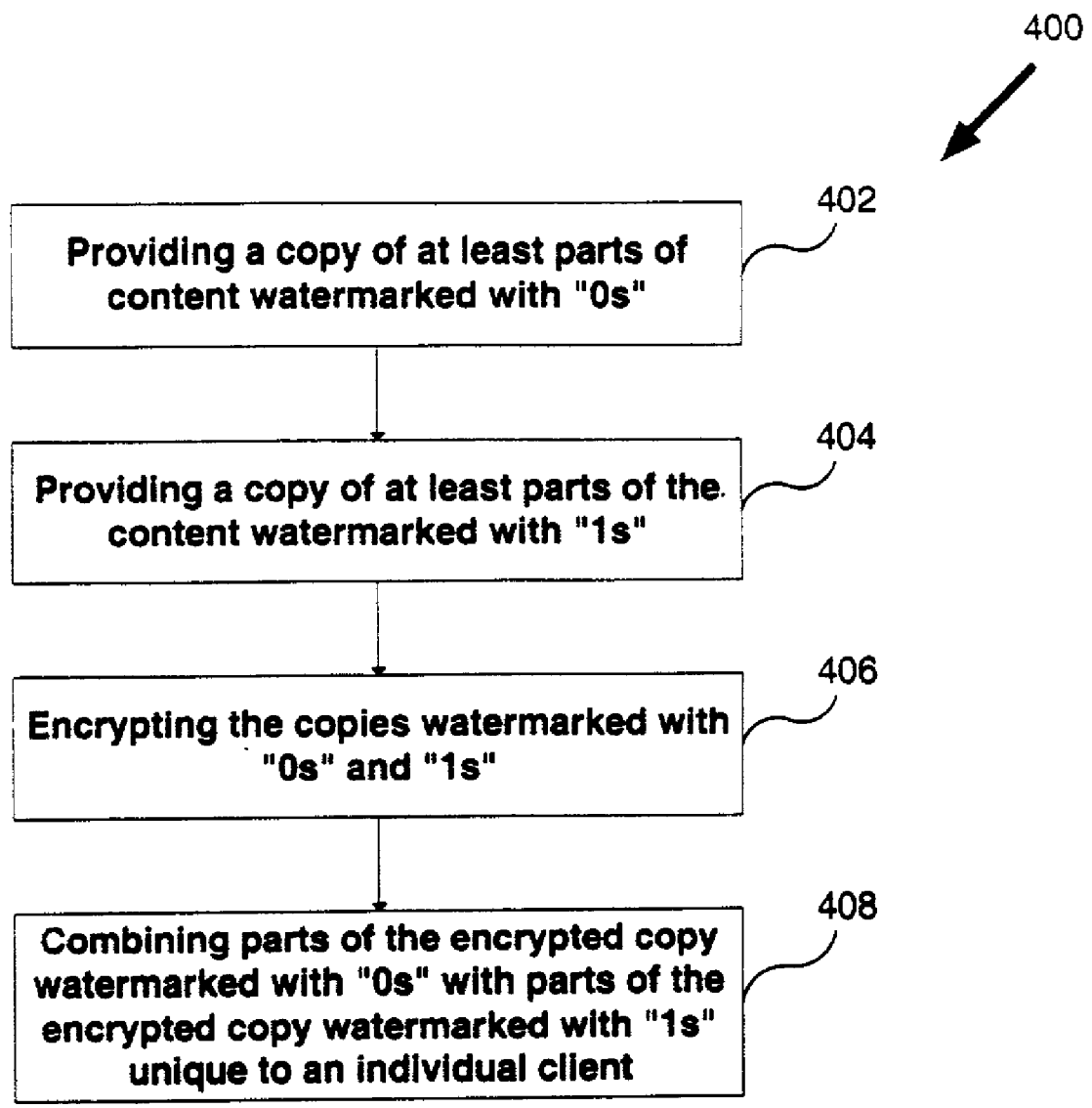
FIG. 4A illustrates a flow chart of an operation to provide encrypted content according to one embodiment.

FIG. 4A illustrates a flow chart of an operation 400 to provide scrambled content according to one embodiment. Initially, operation 400 begins at operation 402.

At operation 402, a copy of at least parts of content watermarked with a first identifier (e.g., "0s") is provided. For example, receiving module 302 provides content watermarked with "0s" to encryption module.

At operation 404, a copy of at least parts of content watermarked with a second identifier (e.g., "1s") is provided. For example, receiving module 302 provides content watermarked with "1s" to encryption module.

At operation 406, the copies of the watermarked content with "0s" and "1s" is encrypted. In one embodiment, encryption module 304 can encrypt the watermarked content into three parts such as neutral copy 210 with a unique Key 1, a first copy 220 of encrypted content watermarked with "1s" with a unique Key 2, and a second copy 230 of encrypted content watermarked with "0s" with a unique Key 3.

At operation 408, parts of first copy 220 and second copy 230 are combined unique to an individual client. In one embodiment, parts of first copy 220 and second copy 230 are combined with neutral copy 210. In an alternative embodiment, parts of first copy 220 and second 230 are combined without neutral copy 210. Encryption module 304 can perform the above operation. Encryption module 304 or key management module 306 can send the unique keys (i.e., Keys 1 through 3) to a client to decrypt the content.

Figure 4B:
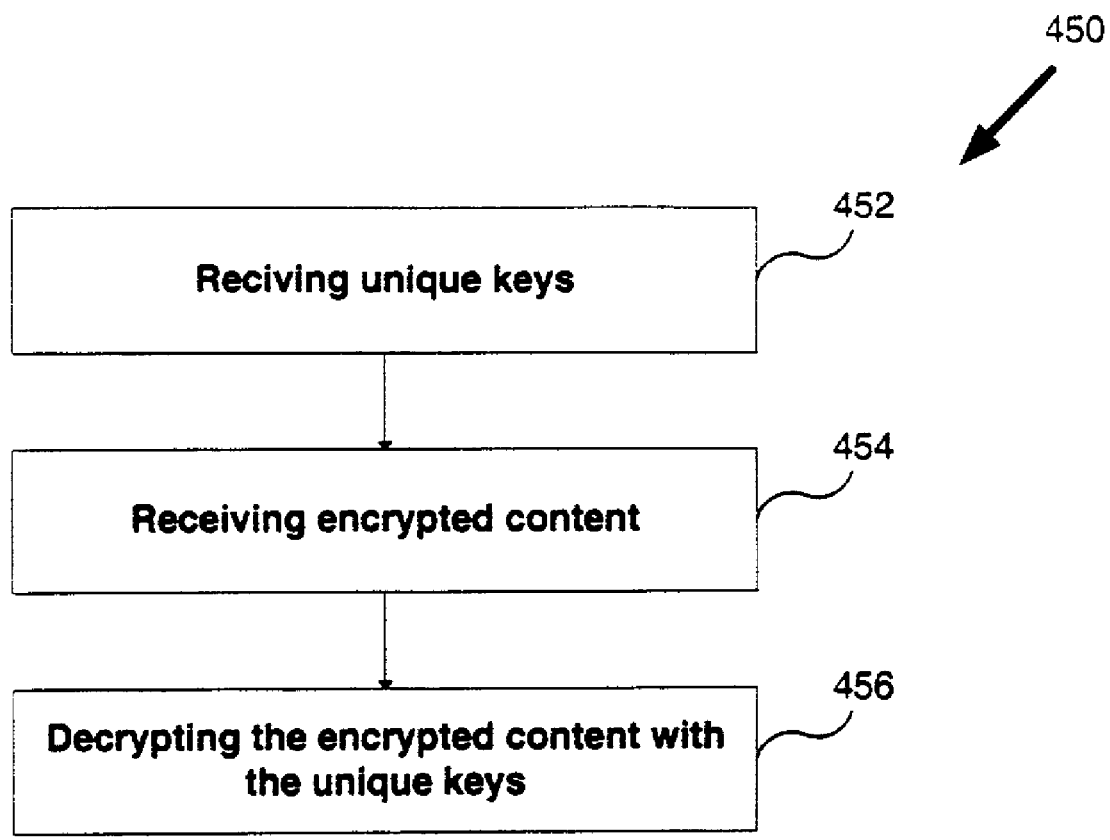
FIG. 4B illustrates a flow chart of an operation to decrypt encrypted content according to one embodiment.

FIG. 4B illustrates a flow chart of an operation 450 to decrypt encrypted content according to one embodiment. Initially, operation 450 begins at operation 452.

At operation 452, unique keys are received, which are used by content server 104 to encrypt content. For example, receiving module 308 within client 100 can receive the unique keys. Receiving module 308 can forward the unique keys to key management module 312 or decryption 310 within client 100.

At operation 454, the encrypted content is received. The encrypted content is "double-illuminated" to refer that at least portions thereof are duplicated and watermarked with different identifiers. For example, client 100 can receive the encrypted content of operation 400 via receiving module 308. Encrypted content, however, can be received before the unique keys are received in operation 452.

At operation 456, the encrypted content is decrypted. For example, decryption module 310 can decrypt the encrypted content from content server 104 using the received unique keys.

Waterplexing Example

The following embodiments with respect to FIGS. 5, 6A, 6B and 7 describe a method and system to identify uniquely multicast content with each of multiple recipients. The following embodiments describe a "waterplexing" process by encrypting, e.g., a single data-stream of video content, in a manner that allows numerous unlocking keys to be distributed to a plurality of recipients ("customers"). Each key can decrypt the content into a unique form. In one embodiment, the content is encrypted once and then distributed to multiple clients. In order for the content to be unlocked and viewed, one or more unique keys are required to decrypt the content. That is, each unique key will cause the resulting decrypted content to be universally unique and viewable.

Figure 5:
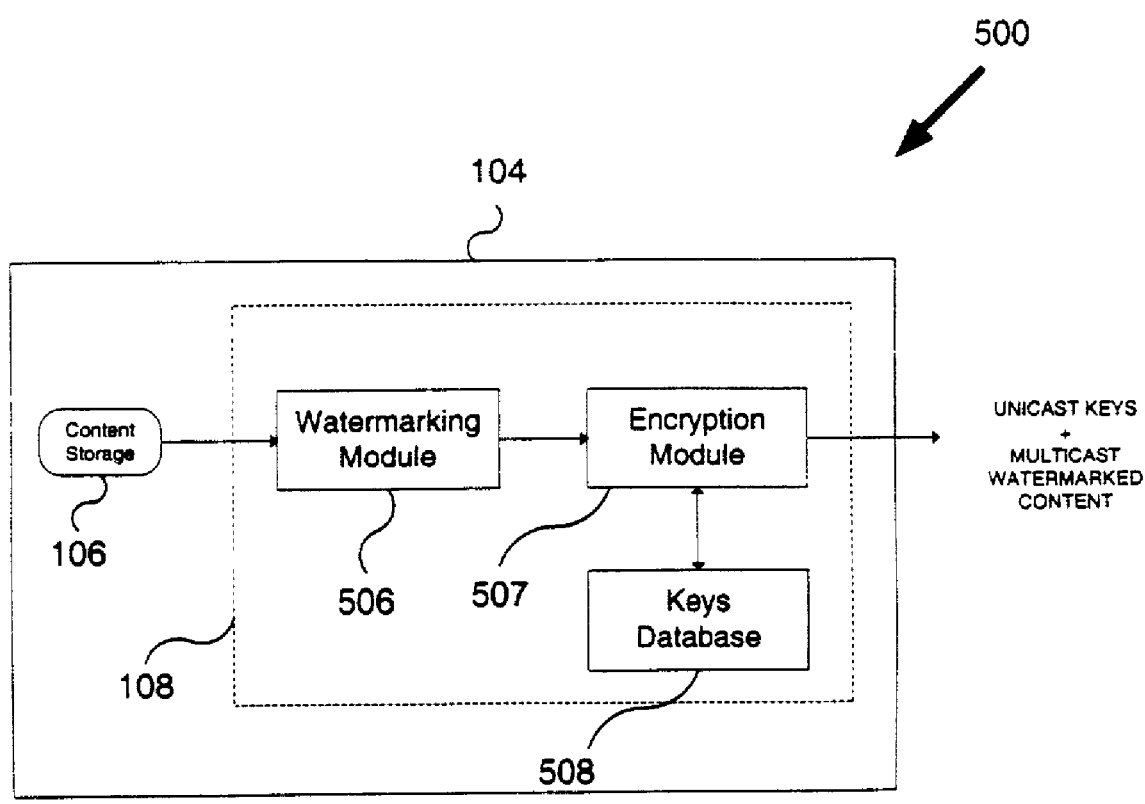
FIG. 5 illustrates a block diagram of a content server for unicasting keys and multicasting encrypted watermarked content according to one embodiment.

FIG. 5 illustrates a block diagram 500 of content server 104 for unicasting keys and multicasting encrypted content according to one embodiment. Referring to FIG. 5, content server 104 includes content storage 106 for storing content, which is coupled to server media module 108. In one embodiment, server media module 108 includes a watermarking module 506 coupled to content storage 106 and encryption module 507, which is coupled to keys database 508. Each of these modules can be a separate processing device or hardware and/or software modules to process instructions or code for performing the operations described herein.

Content storage 106 stores content that is to be multicasted. For example, content storage 106 can store text, audio, and video content. In the following embodiments, content storage 106 stores a stream of video data. Watermarking module 506 processes the stream of video data in content storage 106. In one embodiment, watermarking module 506 adds unique watermarks or stamps to redundant data (e.g., frames or packets within the stream of video data) for a waterplexing process. That is, redundant pieces (e.g., "frames") of data are included in the stream of video data. The watermarks or stamps refer to any modification to one or more frames of video that result in detectable information being added to those frames. Watermarking module 506 forwards the watermarked frames to encrypting module 507.

Encrypting module 507 encrypts the watermarked frames. In one embodiment, because some frames are repeated in the video stream, encrypting module 507 can uniquely encrypt each frame of repeated frames. As such, unique encryption and decryption keys can be used and associated with each redundant frame. Keys database 508 can store such keys. Keys database 508 can include one or more tables of keys, which are mapped for unique clients/users/customers ("customers"), which will be described below. In one embodiment, encrypting module 507 unicasts unique keys from keys database 508 for individual customers. Encrypting module 507 can also multicast watermarked content, which has been encrypted, to all the customers requesting to receive the multicast. In an alternative embodiment, encrypting module 507 can multicast first and then unicast the keys.

Figure 6A:
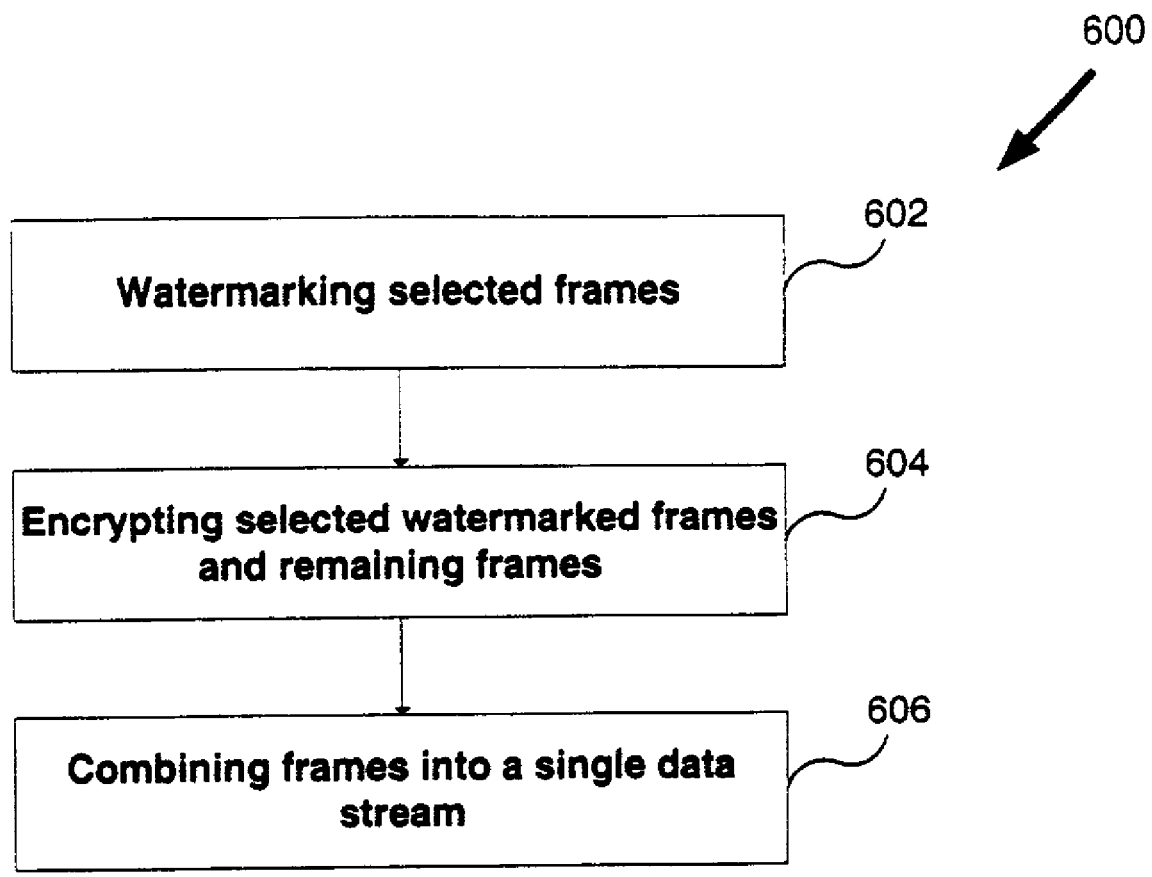
FIG. 6A illustrates a flow chart of an operation to create a single stream of data having encrypted content.

FIG. 6A illustrates a flow chart of an operation 600 to create a single stream of data having encrypted video frames. Initially, operation 600 begins at operation 602.

Figure 7:
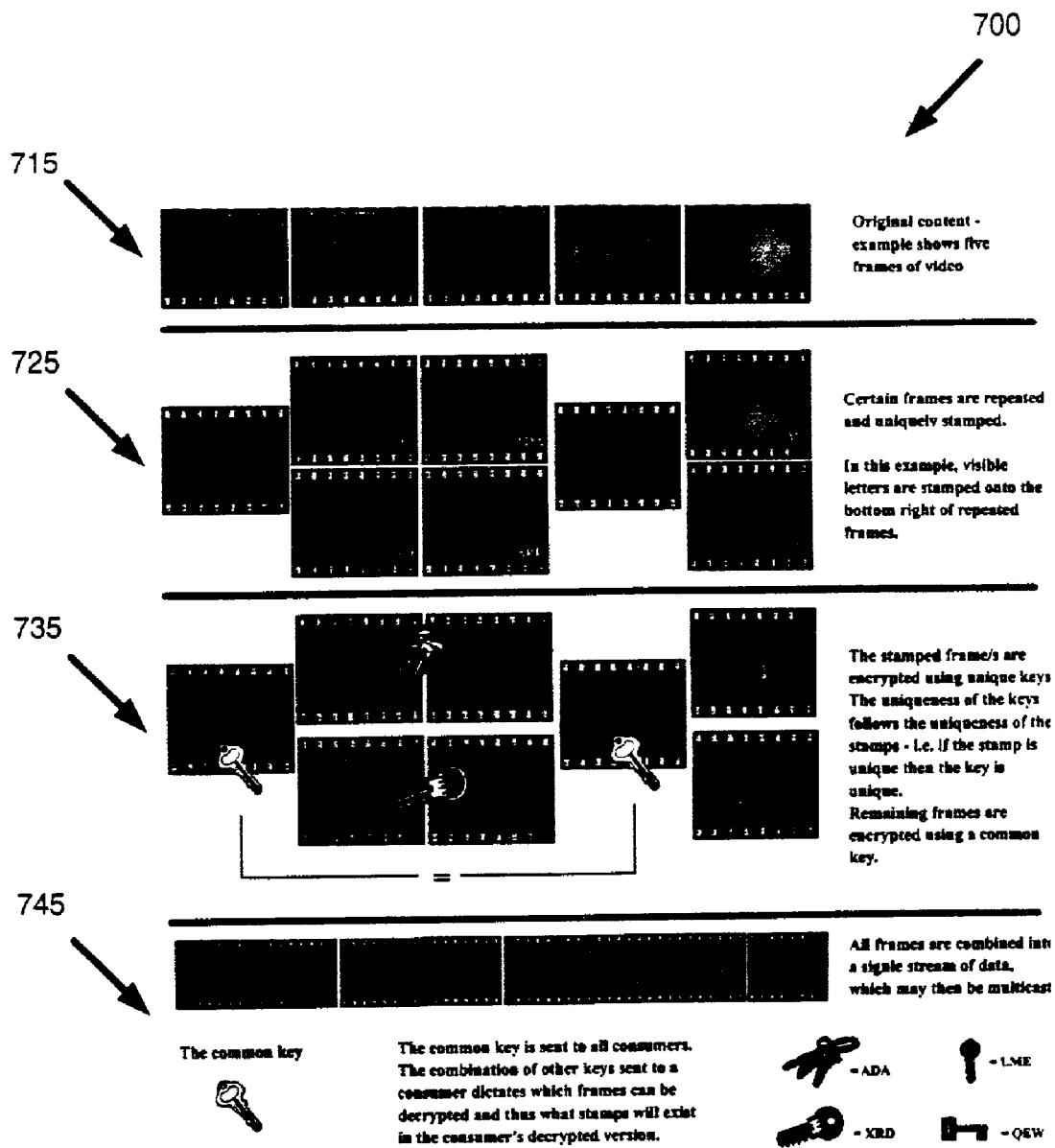
FIG. 7 illustrates exemplary video frames to perform the operation of FIG. 6A.

At operation 602, selected frames within the stream of video data stored in content storage 106 are watermarked. For example, as shown in FIG. 7, frames 715 represents original content of 5 frames. Watermarking module 506 can provide unique watermarks to the repeated frames. The amount of repetition that occurs is not relevant except that repetition does occur, which allows for part of the whole to be uniquely encrypted. In the example of FIG. 7, visible letters are stamped onto the bottom right of the repeated frames as shown in frames 725.

At operation 604, the selected watermarked frames and remaining frames are encrypted with unique keys. As shown in frames 735 of FIG. 7, the stamped frames are encrypted using unique keys that follow the uniqueness of the stamps. That is, if the stamp is unique then the key is unique. The remaining frames are encrypted using a common key. For example, the frames stamped with "ADA," "LME," "XRD," and "QEW" are encrypted with unique keys. The non-stamped or watermarked frames are encrypted with the common key.

At operation 606, the frames 735 are combined into a single data stream as shown in frames 745 of FIG. 7. The single stream of data, i.e., frames 745 can be multicasted to requesting customers. In one embodiment, the common key is sent to all customers. The combination of the other keys set to a customer dictates which frames can be decrypted and thus which stamps will be in the customer's decrypted version. In one embodiment, the decryption keys unique to each customer are unicasted to the customer.

Since frames can be repeated and uniquely stamped and uniquely encrypted, a two-dimensional array of key/stamp pairs can be constructed for any given item of content. The array has a width equal to the number of times a frame is selected for unique stamping, and has a depth equal to the number of times a frame is repeated.

As shown in FIG. 7, individual frames in frames 725 were selected for watermarking of stamping. Here, two watermarks or stamps are used thus requiring an array with a width of two. Within each stamping selection, each frame is repeated twice, which requires a depth of 2. As shown in Table 1 below, a 2×2 array is shown mapping unique keys to individual stamps.

TABLE 1

| Frames 2 & 3 | Frame 5 |
|---|---|
| Key1 = ADA | Key3 = LME |
| Key2 = XRD | Key4 = QEW |

By choosing which keys to send to any given customer, it can be determined as to which stamps will be present in the content once decrypted. For example, the above array has four potential combinations. Thus, four uniquely identifiable versions could exist after decryption. An exemplary Table 2 is shown below associating individual customers with which keys are to be received based on the stamps in the content.

TABLE 2

| Consumer | Keys received | Stamps in content |
|---|---|---|
| Michael | Key 1, Key 3 | ADA, LME |
| Donald | Key 2, Key 4 | XRD, QEW |
| Jane | Key 1, Key 4 | ADA, QEW |
| Mary | Key 2, Key 3 | ZRD, LME |

With repetition of parts of a video-stream, video content can be encrypted in a manner that guarantees uniqueness of the decrypted version. This concept relies on the fact that no customer is given all of the keys required for an item of content, but is given a unique combination of keys just sufficient to decrypt the content to a viewable state.

Most popular video compression techniques involve using key frames (or I frames) to begin a sequence of animation, which is then followed by data that describes how the remaining frames sequentially differ from each other. In one embodiment, since the waterplexing example described above relies on repetition of video frames, a waterplexing engine can be used in conjunction with a video compression engine to determine where key-frames occur in order to provide a compression solution.

Figure 6B:
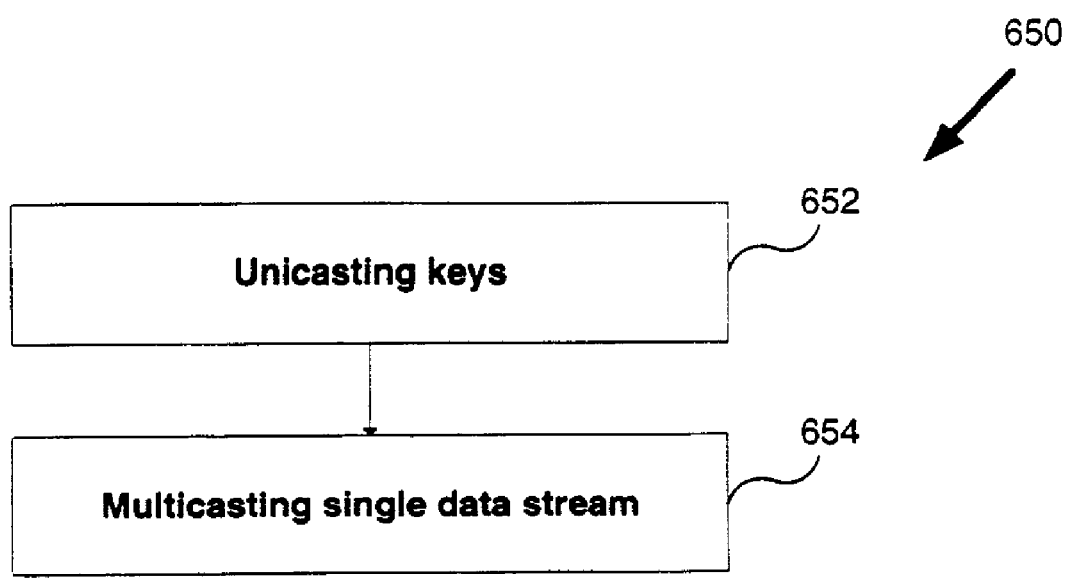
FIG. 6B illustrates a flow chart of an operation of distributing keys and the single stream of data of FIG. 6A.

FIG. 6B illustrates a flow chart of an operation 650 of distributing keys and the single stream of data of FIG. 6A. Initially, operation 650 begins at operation 652.

At operation 652, the unique keys are unicasted. For example, the keys in Tables 1 and 2 above are unicasted to one or more clients or customers.

At operation 654, the single data stream having unique watermarks and encrypted with unique keys is multicasted.

For example, the frames 745 shown in FIG. 7 are multicasted to one or more clients or customers. In other embodiments, the order of operation 652 and operation 654 can be reversed.

Thus, the above operations described in FIGS. 6A and 6B show how to uniquely associate multicast content with each of multiple clients or customers.

Exemplary Digital Processing or Computing System

Figure 8:
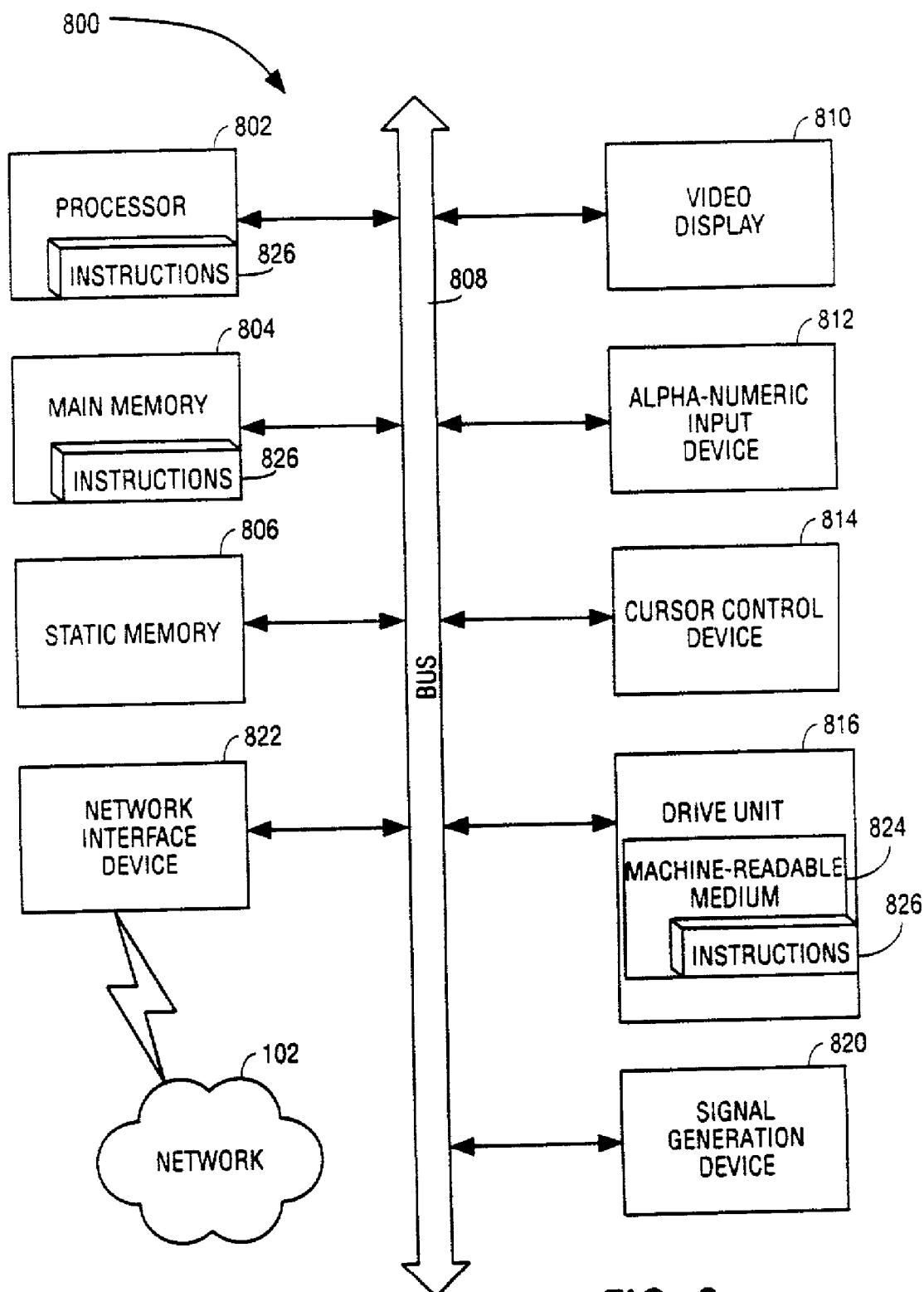
FIG. 8 is a block diagram of an exemplary digital processing or computing system in which the present invention can be implemented.

FIG. 8 is a block diagram of an exemplary digital processing system 800 for a content server or a client. For example, digital processing system 800 can represent content server 104 as described in FIGS. 1, 2, and 5. Digital processing system 800 may store a set of instructions for causing the system to perform any of the operations as explained above. Digital processing system 800 can also represent a client on a network or other types of network devices, which include a network router, a network switch, or a network bridge or gateway. Digital processing system 800 can also represent a client being a portable electronic device such as, for example, a personal data assistant, a mobile device, a web appliance, or any other type of machine capable of executing a sequence of instructions that specify actions to be taken by that machine.

Referring to FIG. 8, digital processing system 800 includes a bus 808 coupled to a central processing unit (CPU) 802, main memory 804, static memory 806, network interface 822, video display 810, alpha-numeric input device 812, cursor control device 814, drive unit 816, and signal generation device 820. The devices coupled to bus 808 can use bus 808 to communicate information or data to each other. Furthermore, the devices of digital processing system 800 are exemplary in which one or more devices can be omitted or added. For example, one or more memory devices can be used for digital processing system 800.

The CPU 802 can process instructions 826 or instructions 826 stored in main memory 804 or a machine-readable medium 824 within drive unit 816 via bus 808. For one embodiment, CPU 802 can process and execute instructions 826 to implement the operations as described in FIGS. 2A, 2B, 6A, and 6B. Bus 808 is a communication medium for communicating data or information for digital processing system 800.

Main memory 804 can be, e.g., a random access memory (RAM) or some other dynamic storage device. Main memory 804 stores instructions 826, which can be used by CPU 802. Main memory 804 may also store temporary variables or other intermediate information during execution of instructions by CPU 802. Static memory 806, can be, e.g., a read only memory (ROM) and/or other static storage devices, for storing information or instructions, which can also be used by CPU 802. Drive unit 816 can be, e.g., a hard or floppy disk drive unit or optical disk drive unit, having a machine-readable medium 824 storing instructions 826. The machine-readable medium 824 can also store other types of information or data.

Video display 810 can be, e.g., a cathode ray tube (CRT) or liquid crystal display (LCD). Video display device 810 displays information or graphics to a user. Alpha-numeric input device 812 is an input device (e.g., a keyboard) for communicating information and command selections to digital processing system 800. Cursor control device 814 can be, e.g., a mouse, a trackball, or cursor direction keys, for controlling movement of an object on video display 810. Signal generation device 820 can be, e.g., a speaker or a microphone.

Digital processing system 800 can be connected to a network 102 via a network interface device 822. Network interface 822 can connect to a network such as, for example, a local area network (LAN), wide area network (WAN), token ring network, Internet, or other like networks. Network interface device 822 can also support varying network protocols such as, for example, hypertext transfer protocol (HTTP), asynchronous transfer mode (ATM), fiber distributed data interface (FDDI), frame relay, or other like protocols.

Thus, a method and system to uniquely identify multicast content with each of multiple recipients have been described. In the foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather than a restrictive sense.

What is claimed is:

1. A computer-implemented method for providing encrypted copies of content comprising:
    encrypting a copy of at least one part of the content having a first watermark;
    encrypting a copy of at least one part of the content having a second watermark; and
    providing encrypted copies for each of a plurality of clients by combining parts of the encrypted copy with the first watermark and parts of the encrypted copy with the second watermark in a manner unique for an individual client, such that the encrypted copies have a unique combination of sections marked with the first watermark and sections marked with the second watermark.

2. The computer-implemented method of claim 1, wherein the first watermark includes "0s" and the second watermark includes "1s."

3. The computer-implemented method of claim 1, further comprising: distributing the combined parts to one or more clients on a network.

4. The computer-implemented method of claim 3, wherein the network includes an Internet network.

5. The computer-implemented method of claim 1, further comprising:
    encrypting a neutral part of the content; and
    combining parts of encrypted neutral copy, parts of the encrypted copy with the first watermark, and parts of the encrypted copy with the second watermark in a manner unique for an individual client.

6. A server comprising:
    a storage device to store content; and
    an encryption module
    to encrypt a copy of at least one part of the content having a first watermark,
    to encrypt a copy of at least one part of the content having a second watermark, and to combine parts of the encrypted copy with the first watermark and parts of the encrypted copy with the second watermark in a manner unique for an individual client, and to provide a plurality of encrypted copies of the content, each having a unique combination of sections marked with the first watermark and sections marked with the second watermark.

7. The server of claim 6, wherein the first watermark includes "0s" and the second watermark includes "1 s."

8. The server of claim 6, wherein the server is to distribute the combined parts to one or more clients on a network.

9. The server of claim 6, wherein the network includes an Internet network.

10. The server of claim 6, wherein the encryption module is to encrypt a neutral part of the content and to combine parts of encrypted neutral copy, parts of the encrypted copy with the first watermark, and parts of the encrypted copy with the second watermark in a manner unique for an individual client.

11. A computing system comprising:
means for storing content; and
means for encrypting a copy of at least one part of the content having a first watermark, a copy of at least one part of the content having a second watermark;
means for combining parts of the encrypted copy with the first watermark and parts of the encrypted copy with the second watermark in a manner unique for an individual client, and
means for providing a plurality of encrypted copies of the content, each having a unique combination of sections marked with the first watermark and sections marked with the second watermark.

12. The computing system of claim 11, wherein the first watermark includes "0s" and the second watermark includes "1s."

13. The computing system of claim 11, further comprising:
means for distributing the combined parts to one or more clients on a network.

14. The computing system of claim 13, wherein the network includes an Internet network.

15. The computing system of claim 11, further comprising:
means for scrambling a neutral part of the content; and
means for combining parts of encrypted neutral copy, parts of the encrypted copy with the first watermark, and parts of the encrypted copy with the second watermark in a manner unique for an individual client.

16. A machine-readable medium providing instructions, which if executed by a processor, causes the processor to perform an operation comprising:
encrypting a copy of at least one part of content having a first watermark;
encrypting a copy of at least one part of content having a second watermark; and
providing encrypted copies for each of a plurality of clients by combining parts of the scrambled copy with the first watermark and parts of the scrambled copy with the second watermark in a manner unique for an individual client, such that the encrypted copies have a unique combination of sections marked with the first watermark and sections marked with the second watermark.

17. A digital processing system for providing encrypted copies of content comprising:

a storage device to store an encrypted copy of at least one part of the content watermarked with a first identifier and an encrypted copy of at least one part of the content watermarked with a second identifier; and a processing unit coupled to the storage device, the processing unit to combine parts of the encrypted copy watermarked with the first and second identifiers in a manner unique to an individual client and to provide a plurality of encrypted copies of the content, each having a unique combination of sections marked with the first watermark and sections marked with the second watermark.

18. The digital processing system of claim 17, wherein the processing unit is to send the combined parts to the individual client.

19. The digital processing system of claim 17, wherein the first identifier includes "0s"and the second identifier include "1 s."

20. The digital processing system of claim 17, wherein the storage device is to store a client identification and a corresponding unique combination of watermarked copies for the client.

21. The digital processing system of claim 17, wherein the storage device is to store a neutral scrambled copy of the content.

22. The digital processing system of claim 21, wherein the processing unit is to combine at least one part of the neutral encrypted copy with parts of the encrypted copy watermarked with the first identifier and with parts of the encrypted copy watermarked with the second identifier.

23. A digital processing system comprising:
a receiving module to provide clear content having a plurality of double parts, a first part watermarked with a first identifier and a second part watermarked with a second identifier;
an encryption module coupled to the receiving module, the encryption module to encrypt the clear content with a first key, to encrypt the first part watermarked with the first identifier with a second key, and to encrypt the second part watermarked with the second identifier with a third key; and
a key management module to manage the keys as to allow one or more clients to decrypt the encrypted content with a combination of encrypted first and second parts watermarked with the first identifier and second identifier, respectively, unique to each client.

24. The digital processing system of claim 23, wherein the first identifier includes "0s" and the second identifier includes "1s."

25. The digital processing system of claim 23, wherein the encryption module is to provide entitlement control messages (ECMs) using the first key, second key, and third key, wherein the second and third key are alternated to obtain a unique combinations of "0s" and "1 s"unique to each client.

26. The digital processing system of claim 23, wherein the storage device is to store a client identification and a corresponding unique combination of watermarked copies for the client.

27. A computer-implemented method for providing an encrypted copy of content comprising:
prior to communication of the encrypted copy of the content,
watermarking first and second copies of content with respective first and second watermarks;
encrypting the first copy of content using a first and the second copy of the content using a second key; and combining encrypted copies into a single stream of data.

28. The computer-implemented method of claim 27, further comprising:
multicasting the single stream of data to one or more clients.

29. The computer-implemented method of claim 27, further comprising:
storing the unique keys and common key in a database, the database including an array matching the unique keys to the unique watermarks.

30. The computer-implemented method of claim 29, further comprising:
selectively unicasting the unique keys to one or more clients.

31. The computer-implemented method of claim 30, further comprising:
associating each client to the unique keys received and watermarks in the stream of data.

32. A server comprising:
a storage device to store content;
a processing unit to watermark redundant parts in the content with one or more unique watermarks, to encrypt the watermarked redundant parts using a unique key for each unique watermark and the remaining parts of the stream of content with a common key, and to combine the encrypted parts into a single stream of data.

33. The server of claim 32, wherein the processing unit is to multicast the single stream of data to one or more clients.

34. The server of claim 32, further comprising:
a database to store the unique keys and common key, the database including an array matching the unique keys to the unique watermarks.

35. The server of claim 32, wherein the processing unit is to unicast selectively the unique keys to one or more clients.

36. The server of claim 32, wherein the processing unit is to associate each client to the unique keys and watermarks in the stream of data.

37. A computing system comprising:
means for storing content;
means for watermarking redundant parts in the content with one or more unique watermarks;
means for encrypting the watermarked redundant parts using a unique key for each unique watermark and the remaining parts of the stream of content with a common key; and
means for combining the encrypted parts into a single stream of data.

38. The computing system of claim 37, further comprising:
means for multicasting the single stream of data to one or more clients.

39. The computing system of claim 37, further comprising:
means for storing in a database the unique keys and common key, the database including an array matching the unique keys to the unique watermarks.

40. The computing system of claim 37, further comprising:
means for unicasting selectively the unique keys to one or more clients.

41. The computing system of claim 37, further comprising:
means for associating each client to the unique keys and watermarks in the stream of data.

42. A machine-readable medium providing instructions, which if executed by a processor, causes the processor to perform an operation comprising:
watermarking redundant parts in content with one or more unique watermarks;
encrypting the watermarked redundant parts using a unique key for each unique watermark and the remaining parts of the stream of content with a common key; and
combining encrypted parts into a single stream of data.

43. A method of distributing content, the method comprising:
watermarking first and second duplicates of a content portion with first and second identifiers respectively;
encrypting each of the first and second duplicates of the content portion with at least first and second keys respectively;
supplying both the first and second duplicates of the content portion to first and second users; and
supplying at least the first key to the first user and the second key to the second user, so that the first user is enabled to decrypt the first duplicate of the content portion watermarked with the first identifier, and so that the second user is enabled to decrypt the second duplicate of the content portion watermarked with the second identifier.

44. The method of claim 43, wherein the content includes text, audio, or video content.

45. The method of claim 43, wherein the supplying of the first and second duplicates and keys includes supplying the first and second duplicates and keys via a network.

46. The method of claim 45, wherein the network include an Internet network.

47. An apparatus comprising:
watermarking means for watermarking first and second duplicates of a content portion with first and second identifiers respectively;
encrypting means for encrypting each of the first and second duplicates of the content portion with at least first and second keys respectively;
supplying means for supplying both the first and second duplicates of the content portion to first and second users; and
supplying means for supplying at least the first key to the first user and the second key to the second user, so that the first user is enabled to decrypt the first duplicate of the content portion watermarked with the first identifier, and so that the second user is enabled to decrypt the second duplicate of the content portion watermarked with the second identifier.

48. The apparatus of claim 47, wherein the content includes text, audio, or video content.

49. The apparatus of claim 47, wherein the supplying means for the first and second duplicates and keys include supplying means for supplying the first and second duplicates and keys via a network.

50. The apparatus of claim 49, wherein the network includes an Internet network.

51. A machine-readable medium providing instructions, which if executed by a processor, causes the processor to perform an operation comprising:
prior to communication of an encrypted copy of content, watermarking first and second duplicates of a content portion with first and second identifiers respectively;
encrypting each of the first and second duplicates of the content portion with at least first and second keys respectively;

after the watermarking and the encrypting, supplying both the first and second duplicates of the content portion to first and second users; and supplying at least the first key to the first user and the second key to the second user, so that the first user is enabled to decrypt the first duplicate of the content portion watermarked with the first identifier, and so that the second user is enabled to decrypt the second duplicate of the content portion watermarked with the second identifier.

52. A method of distributing content, the method comprising:

watermarking multiple sets of duplicated content portions with multiple sets of identifiers, each identifier of each set being unique to a specific duplicated content portion;

encrypting each duplicated content portion within each set with a respective key of a plurality of keys;

supplying the multiple sets of duplicated content portions to multiple users; and supplying a unique set of keys, selected from the plurality of keys, to each of the multiple users so that each of the multiple users is enabled to decrypt the multiple sets of duplicated content portions to generate content embodying a unique sequence of identifiers.

53. The method of claim 52, wherein the supplying of the multiple sets of duplicated content portions includes multicasting the multiple sets of duplicated content portions to the multiple users on an Internet network.

54. The method of claim 53, wherein the supplying of the unique sets of keys to each of the multiple users includes unicasting the unique set of keys to each of the multiple users on the Internet network.

55. The method of claim 52, wherein the content portions include text, audio, or video content portions.

56. An apparatus comprising:

prior to communication of an encrypted copy of content watermarking means for watermarking multiple sets of duplicated content portions with multiple sets of identifiers, each identifier of each set being unique to a specific duplicated content portion;

encrypting means for encrypting each duplicated content portion within each set with a respective key of a plurality of keys;

supplying means for supplying the multiple sets of duplicated content portions to multiple users after the watermarking and the encrypting; and supplying means for supplying a unique set of keys, selected from the plurality of keys, to each of the multiple users so that each of the multiple users is enabled to decrypt the multiple sets of duplicated content portions to generate content embodying a unique sequence of identifiers.

57. The apparatus of claim 56, wherein the supplying means for supplying of the multiple sets of duplicated content portions includes multicasting means for multicasting the multiple sets of duplicated content portions to the multiple users on an Internet network.

58. The apparatus of claim 57, wherein the supplying means for supplying of the unique sets of keys to each of the multiple users includes unicasting means for unicasting the unique set of keys to each of the multiple users on the Internet network.

59. The apparatus of claim 56, wherein the content portions include text, audio or video content portions.

60. A machine-readable medium providing instructions, which if executed by a processors, causes the processor to perform an operation comprising:

prior to communication of an encrypted copy of content, watermarking multiple sets of duplicated content portions with multiple sets of identifiers, each identifier of each set being unique to a specific duplicated content portion;

encrypting each duplicated content portion within each set with a respective key of a plurality of keys;

supplying the multiple sets of duplicated content portions to multiple users after the watermarking and encrypting; and supplying a unique set of keys, selected from the plurality of keys, to each of the multiple users so that each of the multiple users is enabled to decrypt the multiple sets of duplicated content portions to generate content embodying a unique sequence of identifiers.

* * * * *

UNITED STATES PATENT AND TRADEMARK OFFICE
CERTIFICATE OF CORRECTION

PATENT NO.       : 7,058,809 B2
APPLICATION NO.  : 09/800842
DATED            : June 6, 2006
INVENTOR(S)      : White et al.

It is certified that error appears in the above-identified patent and that said Letters Patent is hereby corrected as shown below:

On Sheet 5 of 10, in FIG. 4B (Reference Numeral – 452), line 1, delete "Reciving" and insert -- Receiving --, therefor.

In column 10 (Table 2), line 37, delete "ZRD," and insert -- XRD, --, therefor.

In column 13, line 10, in Claim 7, delete ""1 s."" and insert -- "1s." --, therefor.

In column 14, line 18, in Claim 19, delete ""1 s."" and insert -- "1s." --, therefor.

In column 14, line 55, in Claim 25, delete ""1 s"" and insert -- "1s" --, therefor.

In column 16, line 32, in Claim 46, delete "include" and insert -- includes --, therefor.

Signed and Sealed this

Third Day of April, 2007

JON W. DUDAS
*Director of the United States Patent and Trademark Office*